United States Patent
Kaneko et al.

(10) Patent No.: US 12,475,904 B2
(45) Date of Patent: Nov. 18, 2025

(54) AUDIO SIGNAL CONVERSION MODEL LEARNING APPARATUS, AUDIO SIGNAL CONVERSION APPARATUS, AUDIO SIGNAL CONVERSION MODEL LEARNING METHOD AND PROGRAM

(71) Applicant: NTT, Inc., Tokyo (JP)

(72) Inventors: Takuhiro Kaneko, Musashino (JP); Hirokazu Kameoka, Musashino (JP); Ko Tanaka, Musashino (JP); Nobukatsu Hojo, Musashino (JP)

(73) Assignee: NTT, Inc., Tokyo (JP)

( * ) Notice: Subject to any disclaimer, the term of this patent is extended or adjusted under 35 U.S.C. 154(b) by 213 days.

(21) Appl. No.: 18/032,529

(22) PCT Filed: Oct. 23, 2020

(86) PCT No.: PCT/JP2020/039975
§ 371 (c)(1),
(2) Date: Apr. 18, 2023

(87) PCT Pub. No.: WO2022/085197
PCT Pub. Date: Apr. 28, 2022

(65) Prior Publication Data
US 2023/0386489 A1 Nov. 30, 2023

(51) Int. Cl.
*G10L 21/007* (2013.01)
*G06N 20/00* (2019.01)
*G10L 25/30* (2013.01)

(52) U.S. Cl.
CPC ............ *G10L 21/007* (2013.01); *G06N 20/00* (2019.01); *G10L 25/30* (2013.01)

(58) Field of Classification Search
CPC ............... G10L 21/007; G10L 25/30; G10L 2021/0135; G06N 20/00; G06N 3/045; G06N 3/0464; G06N 3/0475; G06N 3/09
See application file for complete search history.

(56) References Cited

U.S. PATENT DOCUMENTS

| 11,003,955 B1 | 5/2021 | Tan |
| 2012/0059654 A1 | 3/2012 | Nishimura et al. |

(Continued)

FOREIGN PATENT DOCUMENTS

| JP | 2019035902 A | 3/2019 |
| JP | 2019101391 A | 6/2019 |

(Continued)

OTHER PUBLICATIONS

"Shindong Lee et al., ""Many-To-Many Voice Conversion Using Conditional Cycle-Consistent Adversarial Networks""", ICASSP 2020—2020 IEEE International Conference on Acoustics, Speech and Signal Processing (ICASSP), Apr. 9, 2020, DOI: 10.1109/ICASSP40776.2020.9053726".

(Continued)

*Primary Examiner* — Stella L. Woo

(57) ABSTRACT

The present invention is a voice signal conversion model learning device provided with: a learning data acquisition unit for acquiring learning input data, which is an input voice signal; and a learning stage conversion unit for executing a conversion learning model, which is a machine learning model, including learning stage conversion processing for converting the learning input data into learning stage conversion-destination data, which is a conversion-destination voice signal. The learning stage conversion processing includes local feature acquisition processing for acquiring, (Continued)

on the basis of input data to be processed, a feature for each learning input-side subset. The conversion learning model further includes adjustment-parameter-value acquisition processing for acquiring, on the basis of the learning input data, an adjustment parameter value. The learning stage conversion processing converts the learning input data into the learning stage conversion-destination data by using a result of a predetermined computation based on the adjustment parameter value.

6 Claims, 12 Drawing Sheets

(56) References Cited

U.S. PATENT DOCUMENTS

| | | | | |
|---|---|---|---|---|
| 2016/0078859 | A1* | 3/2016 | Luan | G10L 13/027 |
| | | | | 704/260 |
| 2019/0172480 | A1 | 6/2019 | Kaskari et al. | |
| 2019/0385628 | A1* | 12/2019 | Nakashika | G10L 17/04 |
| 2020/0395028 | A1 | 12/2020 | Kameoka et al. | |
| 2020/0410976 | A1* | 12/2020 | Zhou | G06N 3/048 |
| 2021/0201890 | A1 | 7/2021 | Wang et al. | |
| 2022/0068259 | A1* | 3/2022 | Pan | G10L 25/63 |
| 2022/0156552 | A1 | 5/2022 | Kaneko et al. | |
| 2022/0246136 | A1* | 8/2022 | Yang | G06N 3/08 |
| 2023/0360631 | A1 | 11/2023 | Takamichi et al. | |

FOREIGN PATENT DOCUMENTS

| | | |
|---|---|---|
| JP | 2019144402 A | 8/2019 |
| JP | 2020140244 A | 9/2020 |

OTHER PUBLICATIONS

"Hirokazu Kameoka et al., ""ConvS2S-VC: Fully Convolutional Sequenceto-Sequence Voice Conversion"", IEEE/ACM Transactions on Audio, Speech, and Language Processing, Jun. 23, 2020, vol. 28 pp. 1849-1863 DOI: 10.1109/TASLP.2020.3001456".

Jon Magnus Momrak Haug, "Voice Conversion using Deep Learning", 2017, Norwegian University of Science and Technology (Year: 2017).

Takuhiro Kaneko et al., CycleGAN-VC3: Examining and Improving CycleGAN-VCs for Mel-spectrogram Conversion, arXiv preprint, arXiv:2010.11672, Online, Oct. 22, 2020, retrieved on Nov. 5, 2020, Internet: URL: https://arxiv.org/pdf/2010.11672.pdf.

Hirokazu Kameoka et al., StarGAN-VC: Non-Parallel Many-to-Many Voice Conversion With Star Generative Adversarial Networks, arXiv:1806.02169v2, 2018.

Takuhiro Kaneko et al., CycleGAN-VC2: Improved CycleGAN-Based Non-Parallel Voice Conversion, ICASSP2019.

Takuhiro Kaneko et al., StarGAN-VC2: Rethinking Conditional Methods for StarGAN-Based Voice Conversion, arXiv:1907.12279v2, 2019.

* cited by examiner

|  | SF-TF | SM-TM | SF-TM | SM-TF |
|---|---|---|---|---|
| CONVENTIONAL APPROACH | 3.1 | 3.0 | 3.4 | 3.1 |
| APPROACH OF PRESENT INVENTION | 3.8 | 3.4 | 3.6 | 3.5 |

FIG. 10

|  | SF-TF | SM-TM | SF-TM | SM-TF |
|---|---|---|---|---|
| CONVENTIONAL APPROACH | 3.1 | 3.2 | 3.6 | 2.8 |
| APPROACH OF PRESENT INVENTION | 3.5 | 3.4 | 3.6 | 3.1 |

FIG. 11

AUDIO SIGNAL CONVERSION MODEL LEARNING APPARATUS, AUDIO SIGNAL CONVERSION APPARATUS, AUDIO SIGNAL CONVERSION MODEL LEARNING METHOD AND PROGRAM

CROSS-REFERENCE TO RELATED APPLICATIONS

This application is a 371 U.S. National Phase of International Application No. PCT/JP2020/039975, filed on Oct. 23, 2020. The entire disclosure of the above application is incorporated herein by reference.

TECHNICAL FIELD

The present invention relates to an audio signal conversion model learning apparatus, an audio signal conversion apparatus, an audio signal conversion model learning method and a program.

BACKGROUND ART

A technology for converting only non-verbal/paralinguistic information (such as speaker characteristics and an utterance style) while retaining linguistic information (utterance sentences) of an input voice is called voice quality conversion, and is expected to be applied to speaker characteristic conversion of text/voice synthesis, voice assistance, voice emphasis, pronunciation conversion, and the like. As one voice quality conversion technology, for example, use of machine learning has been proposed (Patent Literature 1 to 4).

CITATION LIST

Patent Literature

Patent Literature 1: JP 2019-035902 A
Patent Literature 2: JP 2019-144402 A
Patent Literature 3: JP 2019-101391 A
Patent Literature 4: JP 2020-140244 A

SUMMARY OF INVENTION

Technical Problem

However, in the case of using the machine learning proposed so far, there are cases where some information included in the voice signal before extraction is lost in the process of extracting the feature quantity of the voice signal to be converted. For example, in the case of a convolutional neural network, processing of extracting a feature quantity from a part of input data is repeatedly executed using a filter. Since this processing is contraction processing using a filter, some information is lost due to contraction. In particular, information indicating the structure of the input data, such as information on a correlation between one part and another part of the input data, is lost.

For example, in a case where this is applied to a voice uttered as "ohayou", a part of the sound may be lost in an output voice such as "ohau". This is a phenomenon that occurs because the information of the order in which "yo", which is a part of the input data, is between the preceding and following "ha" and "u" has been lost.

As described above, in the conventional technology, since some information of data input at the time of conversion is lost, learning is not appropriately performed and voice quality conversion is not appropriately performed in some cases.

In view of the above circumstances, an object of the present invention is to provide a technology for reducing loss of information of a voice signal to be converted in a voice quality conversion technology using machine learning.

Solution to Problem

According to an aspect of the present invention, there is provided a voice signal conversion model learning device including: a learning data acquisition unit that acquires learning input data which is an input voice signal; and a learning stage conversion unit that executes a conversion learning model which is a model of machine learning including learning stage conversion processing of converting the learning input data into learning stage conversion destination data which is a voice signal of a conversion destination, in which the learning stage conversion processing includes local feature quantity acquisition processing of acquiring a feature quantity for each learning input-side subset which is a subset of processing target input data having the processing target input data as a population, based on the processing target input data which is data to be processed, the conversion learning model further includes adjustment parameter value acquisition processing of acquiring an adjustment parameter value, which is a value of a parameter for adjusting a statistical value of a distribution of the feature quantity, based on the learning input data, and the learning stage conversion processing converts the learning input data into the learning stage conversion destination data using a result of a predetermined calculation based on the adjustment parameter value.

Advantageous Effects of Invention

According to the present invention, it is possible to provide a technology for reducing loss of information of a voice signal to be converted in a voice quality conversion technology using machine learning.

BRIEF DESCRIPTION OF DRAWINGS

FIG. 10 is a first diagram showing an example of an experimental result according to the embodiment.

FIG. 11 is a second diagram showing an example of an experimental result according to the embodiment.

DESCRIPTION OF EMBODIMENTS

Embodiment

Figure 1:
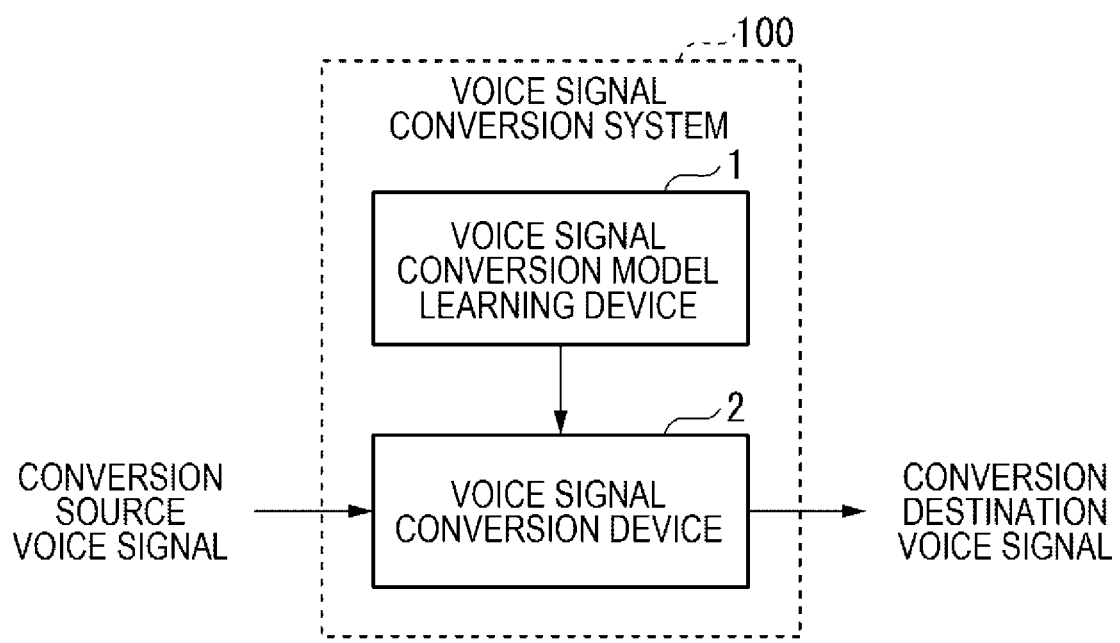
FIG. 1 is an explanatory diagram for explaining an outline of a voice signal conversion system 100 according to an embodiment.

FIG. 1 is an explanatory diagram for explaining an outline of a voice signal conversion system 100 according to an embodiment. The voice signal conversion system 100 converts a conversion source voice signal into a voice signal having a sound attribute indicated by conversion destination sound attribute information based on the conversion destination sound attribute information. The voice signal is a signal representing a voice. The conversion source voice signal is a voice signal to be converted by the voice signal conversion system 100. Hereinafter, the voice signal of the conversion destination of the conversion source voice signal by the voice signal conversion system 100 is referred to as a conversion destination voice signal. The conversion destination sound attribute information is information indicating a sound attribute (hereinafter referred to as a "conversion destination sound attribute") of the voice signal of the conversion destination. The sound attribute is an attribute related to sound. The sound attribute is, for example, the gender of the speaker. The sound attribute may be, for example, an identifier for identifying the speaker.

Therefore, for example, in a case where the conversion destination sound attribute is an attribute of a sound made by a woman and the conversion source sound attribute is an attribute of a sound made by a man, the voice signal conversion system 100 converts a voice signal of a male voice into a voice signal of a female voice. The conversion source sound attribute is a sound attribute of the conversion source voice signal.

Hereinafter, processing of converting a conversion source voice signal into a voice signal having a sound attribute indicated by conversion destination sound attribute information based on the conversion destination sound attribute information is referred to as voice signal conversion processing. Specifically, the voice signal conversion processing is processing of executing a voice signal conversion model. The voice signal conversion model is a model of machine learning learned in advance, and is a model of machine learning for converting a conversion source voice signal into a voice signal having a sound attribute indicated by the conversion destination sound attribute information based on the conversion destination sound attribute information. Therefore, the voice signal conversion model is a result obtained by machine learning and is a learning result of machine learning.

The voice signal conversion system 100 includes a voice signal conversion model learning device 1 and a voice signal conversion device 2. The voice signal conversion model learning device 1 updates a predetermined machine learning model by machine learning until a predetermined end condition is satisfied. The predetermined machine learning model at the time point when the predetermined end condition is satisfied is the voice signal conversion model.

Therefore, the voice signal conversion model learning device 1 acquires the voice signal conversion model by updating a predetermined machine learning model by machine learning until a predetermined end condition is satisfied.

In order to simplify the description below, performing machine learning is also referred to as learning. In addition, updating the model of machine learning (hereinafter referred to as a "machine learning model") by machine learning means suitably adjusting the value of the parameter in the machine learning model. In the following description, learning to be A means that the value of the parameter in the machine learning model is adjusted to satisfy A. A represents a condition. In addition, hereinafter, "for learning" means to be used for updating a machine learning model. Note that the model of machine learning is a set including one or a plurality of types of processing in which a condition and an order to be executed are determined in advance.

The predetermined machine learning model (hereinafter referred to as a "conversion learning model") converts the input voice signal. A voice signal to be converted (hereinafter referred to as "learning input data"), which is a voice signal for learning, is input to the conversion learning model. In addition, a voice signal (hereinafter referred to as "learning reference data"), which is a voice signal for learning and is used for comparison with learning input data after conversion by the conversion learning model, is input to the conversion learning model. That is, the learning reference data is so-called correct answer data in machine learning. Note that, hereinafter, when the learning input data and the learning reference data are not distinguished, they are referred to as learning data.

The conversion learning model converts the input learning input data into learning stage conversion destination data based on the conversion destination sound attribute information. The learning stage conversion destination data is a voice signal of which the sound attribute is closer to the sound attribute indicated by the conversion destination sound attribute information than the learning input data. The voice signal conversion model learning device 1 updates the conversion learning model based on a difference (hereinafter referred to as "loss") between the learning stage conversion destination data and the learning reference data.

Note that the learned conversion learning model is a voice signal conversion model. That is, the conversion learning model at the time point when the predetermined end condition is satisfied is the voice signal conversion model.

Figure 2:
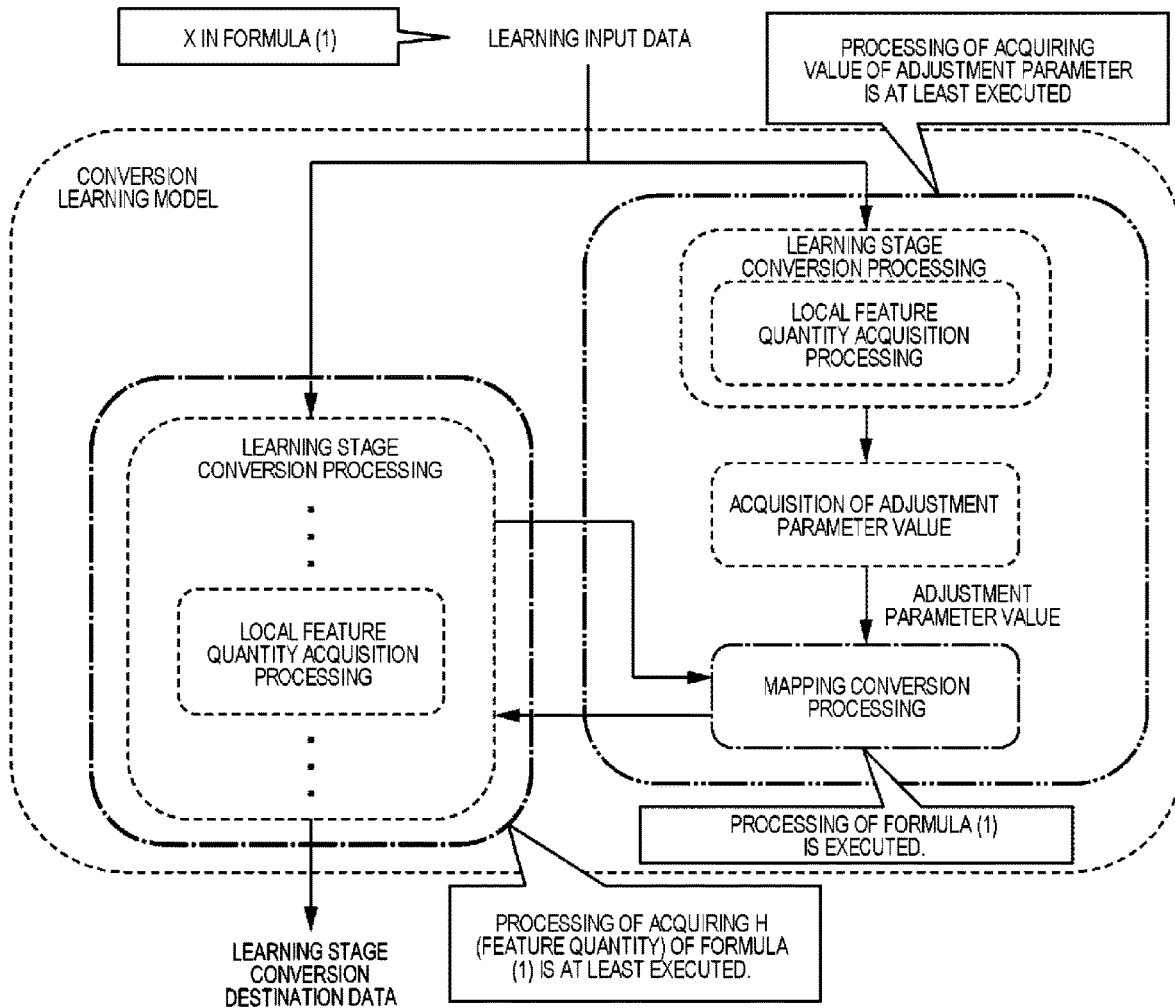
FIG. 2 is a first explanatory diagram for explaining a conversion learning model according to the embodiment.

FIG. 2 is a first explanatory diagram for explaining the conversion learning model according to the embodiment.

The conversion learning model may be any machine learning model as long as the machine learning model satisfies the model condition. The model condition includes at least three conditions of a first network condition, a second network condition, and a third network condition.

The first network condition is a condition including processing of acquiring a feature quantity for each learning input-side subset (hereinafter referred to as a "local feature quantity") based on the input data which is data to be processed (hereinafter referred to as "processing target input data"). The learning input-side subset is a subset of the processing target input data having the processing target input data as a population. Note that the learning input-side subset is desirably a true subset of the processing target input data. Hereinafter, processing of acquiring the local feature quantity for each learning input-side subset based on the processing target input data is referred to as local feature quantity acquisition processing.

More specifically, the local feature quantity is a value obtained for each learning input-side subset and is a feature quantity of each learning input-side subset. One local feature quantity is, for example, a value of one element of a tensor representing an output value of the convolutional neural network. The local feature quantity is, for example, an acoustic feature quantity. The acoustic feature quantity is a feature quantity related to voice such as a Mel-frequency cepstral coefficient, a power spectrum, or a mel spectrum.

The processing target input data is, for example, learning input data. The processing target input data may be, for example, a set (hereinafter referred to as a "local feature quantity set") of local feature quantities obtained by executing the local feature quantity acquisition processing on the learning input data. The processing target input data may be, for example, a local feature quantity set obtained by executing the local feature quantity acquisition processing on the local feature quantity set. As described above, the processing target input data may be any quantity as long as the data is a set of quantities obtained based on the learning input data. In FIG. 2, the learning input data is represented as X. The learning input data is X in Formula (1) to be described later.

The local feature quantity acquisition processing may be executed only once or a plurality of times in the conversion learning model.

The second network condition is a condition including processing of acquiring a value of an adjustment parameter (hereinafter referred to as an "adjustment parameter value") (hereinafter the processing is referred to as "adjustment parameter value acquisition processing"). The adjustment parameter is a parameter for adjusting a statistical value (hereinafter referred to as "global statistical value") of the distribution of the local feature quantity. The global statistical value may be, for example, an average, a median, or a full width at half maximum of the distribution. The adjustment parameter value acquisition processing is processing executed on the learning input data.

The adjustment parameter value acquisition processing is processing of executing, for example, a convolutional neural network (CNN). In such a case, the adjustment parameter value is a value output by the CNN as a result of inputting the learning input data to the CNN. The CNN that outputs the adjustment parameter value is different from the CNN that does not output the adjustment parameter value in that the conversion range of the input data is limited and the global structure of the input data can be retained. Due to such a difference, the CNN that outputs the adjustment parameter value can output the adjustment parameter value unlike the CNN that does not output the adjustment parameter value. This applies not only to the CNN but also to other neural networks. That is, there are a neural network that can output the adjustment parameter value and a neural network that cannot output the adjustment parameter value because of the above-described difference.

The adjustment means processing of converting a statistic such as a size of target data or a deviation from a reference value using four arithmetic operations.

The adjustment parameters are, for example, $\beta(X)$ and $\gamma(X)$ in Formula (1). Therefore, for example, values of $\beta(X)$ and $\gamma(X)$ of Formula (1) are acquired by executing adjustment parameter value acquisition processing for X of Formula (1) to be described later.

The third network condition is a condition that the learning input data is converted into the learning stage conversion destination data using a result of a predetermined calculation based on the adjustment parameter value. Specifically, the third network condition is, for example, a condition that the conversion by the mapping according to the adjustment parameter value is executed on the result of the local feature quantity acquisition processing executed at a predetermined stage among the execution results of the local feature quantity acquisition processing executed in the conversion learning model.

More specifically, the third network condition is a condition that the conversion by the mapping according to the adjustment parameter value is executed for each local feature quantity of the local feature quantity set obtained at a predetermined stage among the local feature quantity sets obtained by executing the conversion learning model. Hereinafter, in the processing executed for each local feature quantity of the target set, conversion by mapping (hereinafter referred to as a "feature quantity conversion mapping") according to the adjustment parameter value is referred to as mapping conversion processing.

The target set is a local feature quantity set obtained by processing at a predetermined stage during execution of the conversion learning model among local feature quantity sets obtained by execution of the conversion learning model. More specifically, the target set is a local feature quantity set obtained by execution of the learning stage conversion processing, and is a local feature quantity set obtained by the target stage processing. The target stage processing is a predetermined processing of obtaining a target set among each processing included in the learning stage conversion processing.

The learning stage conversion processing is processing other than the two types of processing of the adjustment parameter value acquisition processing and the mapping conversion processing among the processing represented by the conversion learning model. That is, the learning stage conversion processing is processing in which the learning input data is input and the learning stage conversion destination data is output.

The learning stage conversion processing may be any processing as long as the local feature quantity acquisition processing is included. The learning stage conversion processing may include, for example, downsampling processing, upsampling processing, or processing of exchanging tensors of feature quantities. Furthermore, the learning stage conversion processing may include, for example, processing of adding a value when the convolution processing is skipped and a value after the convolution processing is applied.

Note that the local feature quantity is an amount represented by a tensor, and it is desirable that the conversion by the feature quantity conversion mapping on the local feature quantity is executed for each element of the local feature quantity. Execution for each element produces an effect of enabling a response to a difference between values of different statistics for each element. For example, in the silent section, the fluctuation of the signal is small, and in the voiced section, the fluctuation of the signal is large, but it is possible to cope with such a difference in fluctuation.

The feature quantity conversion mapping is, for example, affine conversion. The affine conversion is represented by, for example, Formula (1). More specifically, the affine conversion of Formula (1) is an example of the feature quantity conversion mapping used in a case where the input data to be processed is the output result of the convolution layer. That is, the affine conversion of Formula (1) is an example of the feature quantity conversion mapping used in a case where the target stage processing is the processing of the convolution layer.

[Math. 1]

$$H' = \gamma(X) \cdot H + \beta(X) \quad (1)$$

In the affine conversion represented by Formula (1), X is input data to be processed. X is a tensor of which the element is a real number and is at least a third-order tensor. H in Formula (1) represents a feature quantity to be subjected to the mapping conversion processing. H in Formula (1) is a tensor of which the element is a real number and is at least a third-order tensor. H in Formula (1) is, for example, a tensor of a third-order tensor of q×t×c. q represents a feature quantity dimension number, t represents a sequence length, and c represents the number of channels. The feature quantity dimension number means the number of dimensions in the frequency direction of the feature quantity H. In Formula (1), "·" represents an element product, and "+" represents an element sum. H' in Formula (1) is a result of conversion of H in Formula (1) by conversion of the right side of Formula (1).

γ is an adjustment parameter and is a scale parameter in the affine conversion. γ is a tensor of which the element is a real number and is a third-order tensor of q×t×c. β is an adjustment parameter and is a bias parameter in the affine conversion. β is a tensor of which the element is a real number and is a third-order tensor of q×t×c. The scale parameter γ and the bias parameter β are examples of adjustment parameters.

The processing executed in the mapping conversion processing is, for example, processing of converting the feature quantity H into the feature quantity H' by Formula (1). Therefore, a set based on the feature quantity H in Formula (1) is an example of the target set.

In the conversion learning model, the parameter of the neural network that executes the learning stage conversion processing and the parameter of the neural network that executes the adjustment parameter value acquisition processing are suitably adjusted based on the loss. Hereinafter, the neural network that executes the learning stage conversion processing is referred to as a learning stage conversion processing network. Hereinafter, a neural network that executes the adjustment parameter value acquisition processing is referred to as an adjustment parameter value acquisition network.

Note that the neural network is a circuit such as an electronic circuit, an electrical circuit, an optical circuit, or an integrated circuit, and is a circuit representing a machine learning model. Note that the parameters of the network suitably adjusted based on the loss are parameters of the machine learning model to be expressed. The parameter of the network is a parameter of a circuit constituting the network.

The learning stage conversion processing network may be any neural network as long as the neural network executes the learning stage conversion processing. The learning stage conversion processing network may be, for example, a fully connected neural network or a convolutional neural network (CNN) or an auto encoder.

Note that the local feature quantity set obtained at a predetermined stage during the execution of the learning stage conversion processing means a local feature quantity set output by a predetermined layer included in the learning stage conversion processing network. That is, the stage means a layer of the neural network.

The adjustment parameter value acquisition network may be any neural network as long as the neural network executes the adjustment parameter value acquisition processing. The adjustment parameter value acquisition neural network may be, for example, a CNN.

Note that the size of the data as a result of the adjustment parameter value acquisition processing may be a size depending on the size of the learning input data. In particular, the size of the data as a result of the adjustment parameter value acquisition processing is desirably the same as the size of the local feature quantity of the target of the mapping conversion processing. For example, the adjustment parameter β and the adjustment parameter γ are multiplied by the feature quantity H to be subjected to the mapping conversion processing for each element, as shown in Formula (1). Therefore, the size of the data as a result of the adjustment parameter value acquisition processing is desirably the same size as the size of the local feature quantity of the target of the mapping conversion processing. Note that the size of data means the number of channels, height, and width of data in a case where the data is data expressed in a three-dimensional space spanned by three axes orthogonal to an axis of the number of channels, an axis of height, and an axis of width.

Note that the learning stage conversion processing network and the adjustment parameter value acquisition network do not necessarily need to be configured by different neural networks, and the learning stage conversion processing network and the adjustment parameter value acquisition network may be configured as a neural network that shares some part.

When acquiring a plurality of adjustment parameter values, the learning stage conversion processing network and the adjustment parameter value acquisition network may be a neural network that shares some layers of the neural network that acquires the respective values. For example, the neural network that computes the scale parameter and the neural network that computes the bias parameter may be a neural network that shares some layers. For simplicity of description, the voice signal conversion system 100 will be described by exemplifying a case where the learning stage conversion processing network and the adjustment parameter value acquisition network are configured as different neural networks.

The voice signal conversion device 2 executes voice signal conversion processing.

Figure 3:
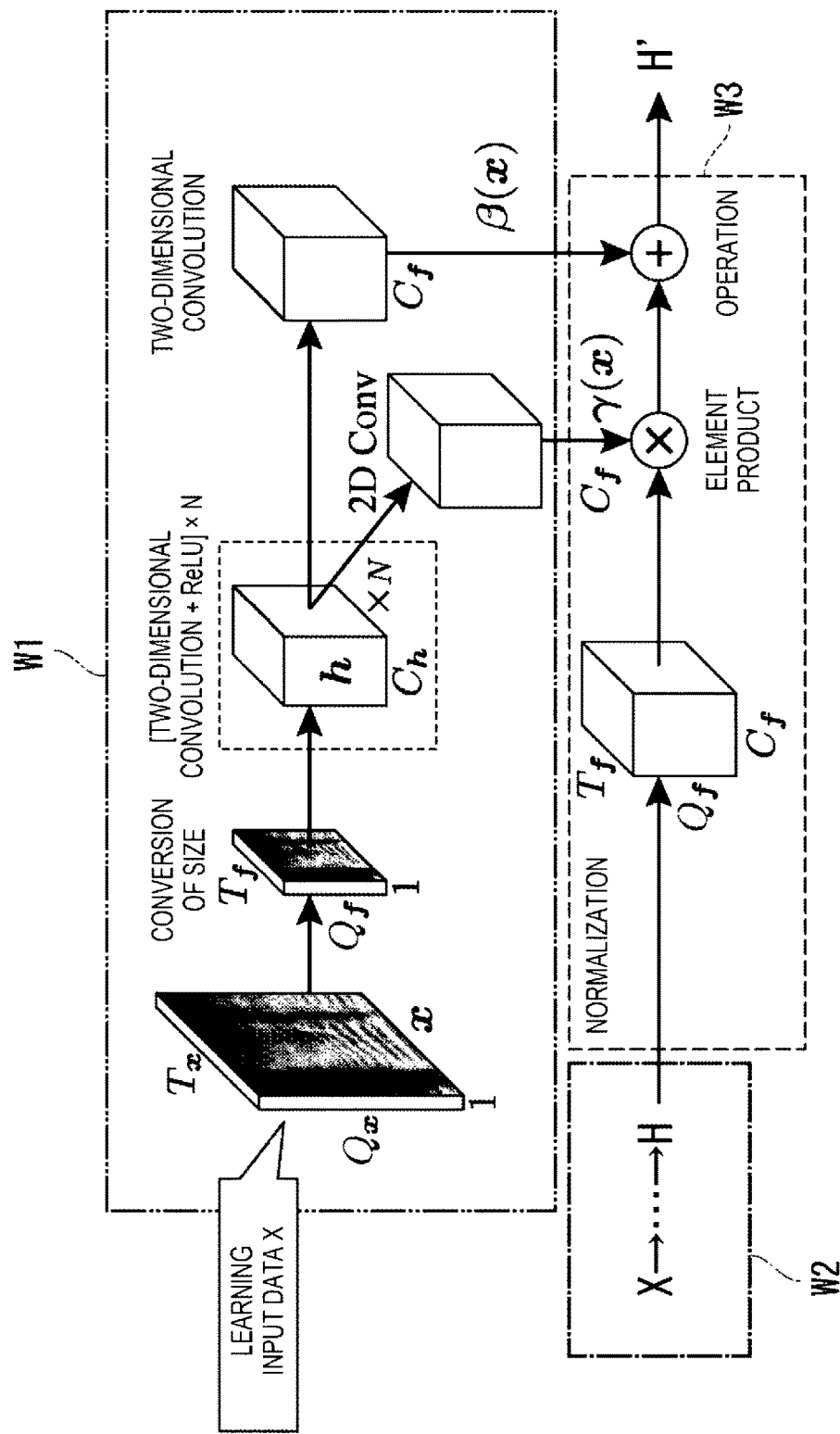
FIG. 3 is a second explanatory diagram for explaining a conversion learning model according to the embodiment.

FIG. 3 is a second explanatory diagram for explaining the conversion learning model according to the embodiment. More specifically, FIG. 3 is an explanatory diagram for explaining an example of a neural network representing the conversion learning model (hereinafter referred to as a "description network") described in FIG. 2. The description network includes a neural network W1, a neural network W2, and a neural network W3.

The neural network W1 is a neural network that executes processing of outputting β(X) and γ(X) of Formula (1) based on the learning input data X when the learning input data X is input.

The neural network W1 executes size conversion processing for converting the learning input data of Qx×Tx×1 size into data of Qf×Tf×1 size. Next, the neural network W1 executes processing of executing two-dimensional convolution and nonlinear processing using an activation function ReLU N times on data of Qf×Tf×Cf size. Next, the neural network W1 executes two-dimensional convolution processing on the result of the processing of executing the two-dimensional convolution and the nonlinear processing using the activation function ReLU N times. As a result, the neural network W1 obtains values of the adjustment parameter β and the adjustment parameter γ.

The neural network W2 is a neural network that executes processing of acquiring the feature quantity H of Formula (1) based on the learning input data X when the learning input data X is input.

The neural network W3 converts the feature quantity H acquired by the neural network W2 into the feature quantity H' in Formula (1) using the adjustment parameters β and γ acquired by the neural network W1.

The neural network W3 executes processing of normalizing the feature quantity H. The normalization processing is specifically processing represented by the following Formula (2).

[Math. 2]

$$\frac{H - \mu(H)}{\sigma(H)} \quad (2)$$

In Formula (2), μ(H) represents an average value of H for each channel. In Formula (2), σ(H) represents a standard deviation for each channel. The processing represented by Formula (2) is adjustment of the standard deviation and the average value of the distribution of the feature quantity H. Data output as a result of the normalization processing is data of Qf×Tf×Cf size.

Next, the neural network W3 computes the element product of H after normalization using the adjustment parameter γ acquired by the neural network W1. Next, the neural network W3 adds the adjustment parameter β to the computed element product by using the adjustment parameter β acquired by the neural network W1. The result of addition is the feature quantity H'. In this manner, the neural network W3 acquires the feature quantity H' based on the feature quantity H. The processing executed by the neural network W3 is expressed by the following Formula (3).

[Math. 3]

$$H' = \gamma(X) \cdot \frac{H - \mu(H)}{\sigma(H)} + \beta(X) \quad (3)$$

Note that the processing of adding β is processing of adjusting the average position of the distribution of the feature quantity H. As described above, by normalizing the feature quantity H using μ(H) and σ(H) and then applying β and γ, it is possible to convert the average and the standard deviation of the converted feature quantity H' into a value of β and a value of γ, respectively. Processing of converting the value of the feature quantity H into another value such as the feature quantity H' by executing the processing of converting the statistical value of the distribution of the feature quantity H is an example of the adjustment.

Note that, although the example in which the two-dimensional CNN is applied to the third-order tensor has been described above, the (M−1)-dimensional CNN may be applied to any (M-th)-order tensor. For example, a one-dimensional CNN may be applied to the second-order tensor.

Figure 4:
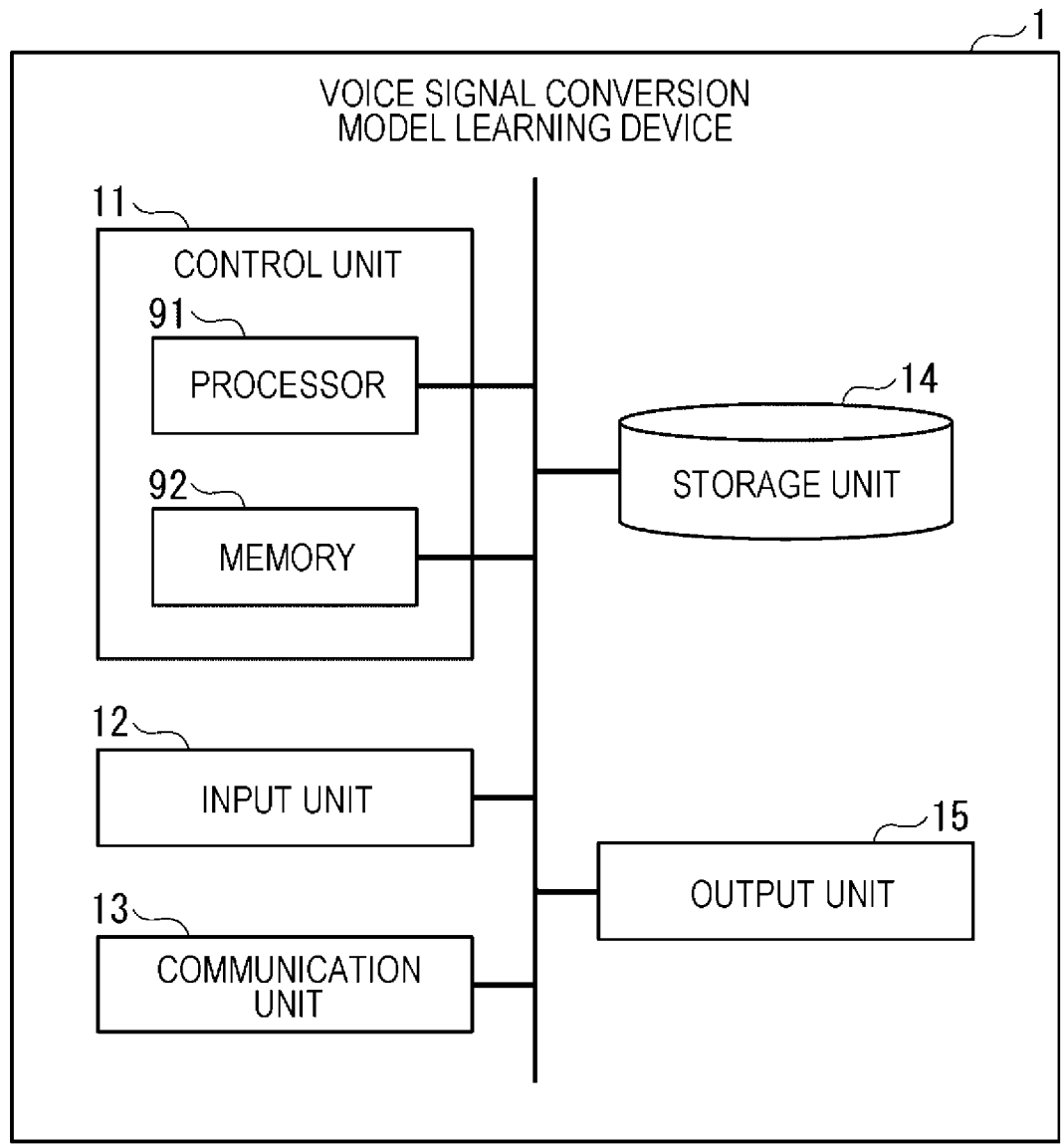
FIG. 4 is a diagram showing an example of a hardware configuration of a voice signal conversion model learning device 1 according to the embodiment.

FIG. 4 is a diagram showing an example of a hardware configuration of the voice signal conversion model learning device 1 according to the embodiment. The voice signal conversion model learning device 1 includes a control unit 11 including a processor 91 such as a CPU and a memory 92, which are connected via a bus, and executes a program. The voice signal conversion model learning device 1 functions as a device including the control unit 11, an input unit 12, a communication unit 13, a storage unit 14, and an output unit 15 by executing a program.

More specifically, the processor 91 reads the program stored in the storage unit 14, and stores the read program in the memory 92. The processor 91 executes the program stored in the memory 92, whereby the voice signal conversion model learning device 1 functions as a device including the control unit 11, the input unit 12, the communication unit 13, the storage unit 14, and the output unit 15.

The control unit 11 controls operations of various functional units included in the voice signal conversion model learning device 1. The control unit 11 executes the conversion learning model. Executing the conversion learning model means executing the learning stage conversion processing, the adjustment parameter value acquisition processing, and the mapping conversion processing. For example, the control unit 11 controls the operation of the output unit 15 and causes the output unit 15 to output the execution result of the conversion learning model. The control unit 11 records, for example, various types of information generated by execution of the conversion learning model in the storage unit 14. The various types of information stored in the storage unit 14 include, for example, a learning result of the conversion learning model.

The input unit 12 includes an input device such as a mouse, a keyboard, or a touch panel. The input unit 12 may be configured as an interface that connects these input devices to the voice signal conversion model learning device 1. The input unit 12 receives inputs of various types of information to the voice signal conversion model learning device 1. For example, the learning data is input to the input unit 12.

The communication unit 13 includes a communication interface for connecting the voice signal conversion model learning device 1 to an external device. The communication unit 13 communicates with an external device in a wired or wireless manner. The external device is, for example, a device that is a transmission source of the learning data.

The storage unit 14 is configured using a non-transitory computer-readable storage medium device such as a magnetic hard disk device or a semiconductor storage device. The storage unit 14 stores various types of information regarding the voice signal conversion model learning device 1. The storage unit 14 stores, for example, information input via the input unit 12 or the communication unit 13. The storage unit 14 stores, for example, a conversion learning model. The storage unit 14 stores, for example, various types of information generated by execution of the conversion learning model.

Note that the learning data does not necessarily need to be input only to the input unit 12, and does not need to be input only to the communication unit 13. The learning data may be input from either the input unit 12 or the communication unit 13. For example, the learning reference data may be input to the input unit 12, and the learning input data corresponding to the learning reference data input to the input unit 12 may be input to the communication unit 13. In addition, the learning data is not necessarily acquired from the input unit 12 or the communication unit 13, and may be stored in the storage unit 14 in advance.

The output unit 15 outputs various types of information. The output unit 15 includes a display device such as a cathode ray tube (CRT) display, a liquid crystal display, or an organic electro-luminescence (EL) display, for example. The output unit 15 may be configured as an interface that connects these display devices to the voice signal conversion model learning device 1. The output unit outputs, for example, information input to the input unit 12. The output unit 15 may display, for example, the learning data input to the input unit 12 or the communication unit 13. The output unit 15 may display, for example, an execution result of the conversion learning model.

Figure 5:
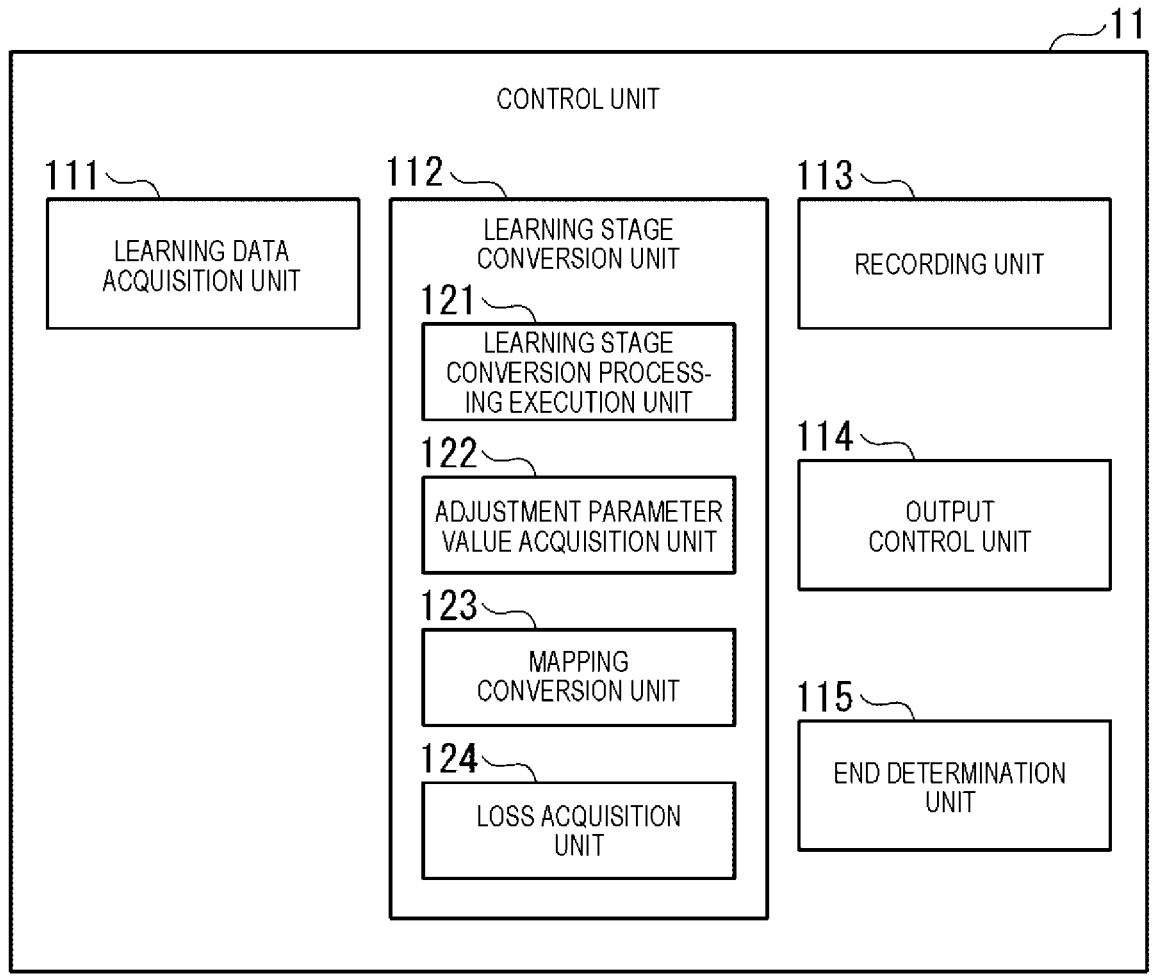
FIG. 5 is a diagram showing an example of a functional configuration of a control unit 11 according to the embodiment.

FIG. 5 is a diagram showing an example of a functional configuration of the control unit 11 according to the embodiment. The control unit 11 includes a learning data acquisition unit 111, a learning stage conversion unit 112, a recording unit 113, an output control unit 114, and an end determination unit 115.

The learning data acquisition unit 111 acquires the learning data input to the input unit 12 or the communication unit 13. When the learning data has been recorded in advance in the storage unit 14, the learning data acquisition unit 111 may read the learning data from the storage unit 14.

The learning stage conversion unit 112 executes execution of conversion learning model and processing of learning the conversion learning model based on the loss obtained based on the execution result of the conversion learning model. The learning stage conversion unit 112 includes a learning stage conversion processing execution unit 121, an adjustment parameter value acquisition unit 122, a mapping conversion unit 123, and a loss acquisition unit 124.

The learning stage conversion processing execution unit 121 executes learning stage conversion processing. Therefore, the learning stage conversion processing execution unit 121 is, for example, a learning stage conversion processing network. The neural network that forms the learning stage conversion processing execution unit 121 includes, for example, the neural network W2 in FIG. 3.

The adjustment parameter value acquisition unit 122 executes adjustment parameter value acquisition processing. Therefore, the adjustment parameter value acquisition unit 122 is, for example, an adjustment parameter value acquisition network. The adjustment parameter value acquisition unit 122 is, for example, the neural network W1 in FIG. 3.

The mapping conversion unit 123 executes mapping conversion processing by feature quantity conversion mapping according to the adjustment parameter value obtained by executing the adjustment parameter value acquisition processing for each local feature quantity of the target set in the local feature quantity set obtained by executing the learning stage conversion processing. The mapping conversion unit 123 is, for example, the neural network W3 in FIG. 3.

The loss acquisition unit 124 acquires a loss based on the learning stage conversion destination data obtained by executing the learning stage conversion processing and the learning reference data. The loss acquisition unit 124 updates the conversion learning model based on the loss. Specifically, the update of the conversion learning model based on the loss is processing in which the loss acquisition unit 124 updates the values of the parameters of the learning stage conversion processing network and the adjustment parameter value acquisition network according to a predetermined rule based on the loss. For example, the loss acquisition unit 124 updates the values of the parameters of the learning stage conversion processing network and the adjustment parameter value acquisition network to reduce the loss.

The learning stage conversion processing execution unit 121, the adjustment parameter value acquisition unit 122, the mapping conversion unit 123, and the loss acquisition unit 124 may be anything as long as a neural network capable of executing and updating the conversion learning model can be formed by mutual cooperation.

For example, the learning stage conversion processing execution unit 121 and the loss acquisition unit 124 may be a circuit that forms a neural network that operates as generative adversarial networks (GAN) by operating in cooperation. In such a case, the adjustment parameter value acquisition unit 122 acquires the adjustment parameter value, and the mapping conversion unit 123 executes the mapping conversion processing on each local feature quantity of the target set obtained by the target stage processing of the GAN. The GAN executes the processing of the next stage of the target stage processing using the result of the mapping conversion processing. The processing of the next stage of the target stage processing means processing executed in the layer next to the layer in which the target stage processing in the neural network is executed.

For example, the learning stage conversion processing execution unit 121 and the loss acquisition unit 124 may be a circuit that forms a neural network that operates Cycle-GAN by operating in cooperation. In such a case, in such a case, the adjustment parameter value acquisition unit 122 acquires the adjustment parameter value, and the mapping conversion unit 123 executes the mapping conversion processing on each local feature quantity of the target set obtained by the target stage processing of the CycleGAN. The CycleGAN executes the processing of the next stage of the target stage processing using the result of the mapping conversion processing.

For example, the learning stage conversion processing execution unit 121 and the loss acquisition unit 124 may be a circuit that forms a neural network that operates as a conditional variational autoencoder (CVAE) by operating in cooperation.

For example, the learning stage conversion processing execution unit 121 and the loss acquisition unit 124 may be a circuit that forms a neural network that performs parallel voice quality conversion by operating in cooperation.

The recording unit 113 records various types of information in the storage unit 14. The output control unit 114 controls the operation of the output unit 15. The end determination unit 115 determines whether or not a predetermined end condition is satisfied. The conversion learning model at the time point when the predetermined end condition is satisfied is a learned conversion learning model and a voice signal conversion model.

Figure 6:
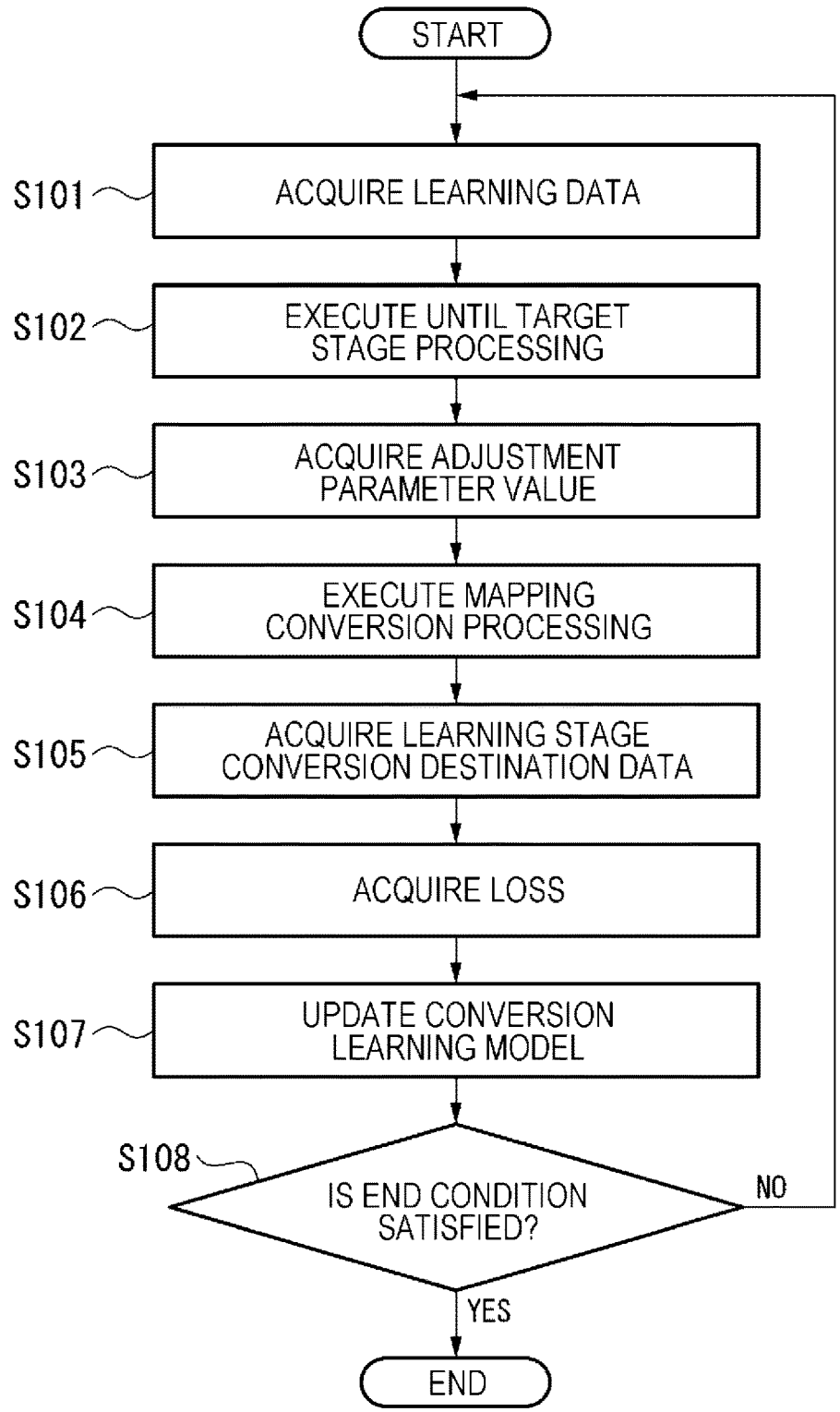
FIG. 6 is a flowchart showing an example of a flow of processing executed by the voice signal conversion model learning device 1 according to the embodiment.

FIG. 6 is a flowchart showing an example of a flow of processing executed by the voice signal conversion model learning device 1 according to the embodiment. Hereinafter, an example of a flow of processing executed by the voice signal conversion model learning device 1 will be described using a case where there is one target stage processing included in the learning stage conversion processing as an example for simplicity of description. When there are a plurality of types of target stage processing, the adjustment parameter value acquisition processing and the mapping conversion processing are executed for each target stage processing.

The learning data acquisition unit 111 acquires learning data (step S101). Next, the learning stage conversion processing execution unit 121 executes processing up to the target stage processing (step S102). Next, the adjustment parameter value acquisition unit 122 acquires the adjustment parameter value (step S103). Next, the mapping conversion unit 123 executes mapping conversion processing according to the adjustment parameter value obtained in step S103 for each local feature quantity of the local feature quantity set (that is, the target set) obtained by the processing of step S102 (step S104).

Next, the learning stage conversion processing execution unit 121 executes processing from the next processing of the target stage processing to the last processing of the learning stage conversion processing by using the converted local feature quantity obtained by the processing of step S104 (step S105). The learning stage conversion destination data is obtained by the processing of step S105. After step S105, the loss acquisition unit 124 acquires a loss based on the learning stage conversion destination data and the learning reference data (step S106). Next, the loss acquisition unit 124 updates the conversion learning model based on the loss (step S107). Next, the end determination unit 115 determines whether or not a predetermined end condition is satisfied (step S108). When the predetermined end condition is not satisfied (step S108: NO), the processing returns to step S101. On the other hand, when the predetermined end condition is satisfied (step S108: YES), the processing ends.

Figure 7:
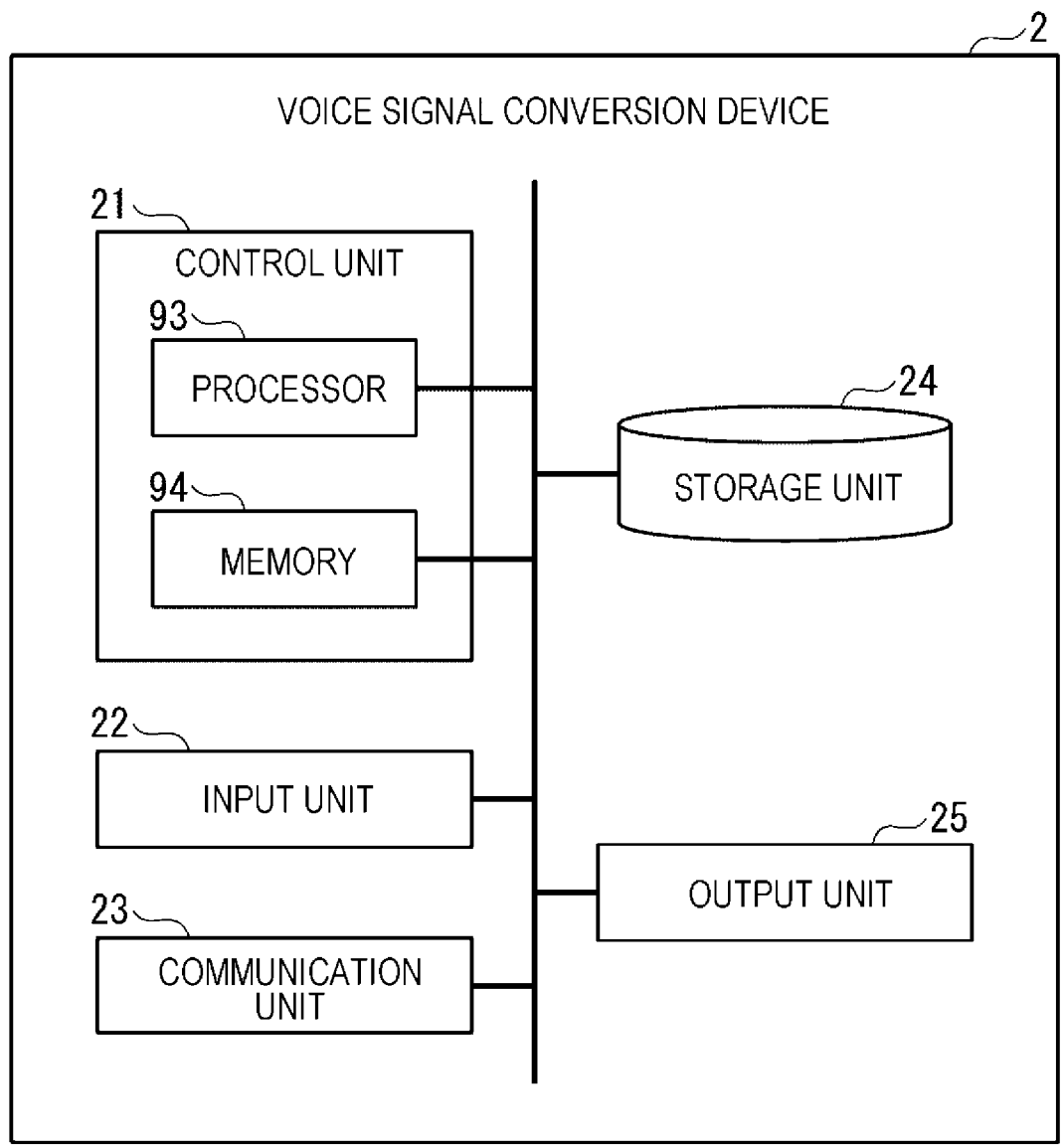
FIG. 7 is a diagram showing an example of a hardware configuration of a voice signal conversion device 2 according to the embodiment.

FIG. 7 is a diagram showing an example of a hardware configuration of the voice signal conversion device 2 according to the embodiment. The voice signal conversion device 2 includes the control unit 21 including a processor 93 such as a CPU and a memory 94, which are connected via a bus, and executes a program. The voice signal conversion device 2 functions as a device including the control unit 21, an input unit 22, a communication unit 23, a storage unit 24, and an output unit 25 by executing a program.

More specifically, the processor 93 reads the program stored in the storage unit 24, and stores the read program in the memory 94. The processor 93 executes the program stored in the memory 94, whereby the voice signal conversion device 2 functions as a device including the control unit 21, the input unit 22, the communication unit 23, the storage unit 24, and the output unit 25.

The control unit 21 controls operations of various functional units included in the voice signal conversion device 2. The control unit 21 converts the conversion source voice signal into the conversion destination voice signal using, for example, the learned conversion learning model (that is, the voice signal conversion model) obtained by the voice signal conversion model learning device 1.

The input unit 22 includes an input device such as a mouse, a keyboard, or a touch panel. The input unit 22 may be configured as an interface that connects these input devices to the host device. The input unit 22 receives inputs of various types of information to the host device. For example, the input unit 22 receives an input instructing start of processing of converting the conversion source voice signal into the conversion destination voice signal. The input unit 22 receives, for example, an input of a conversion source voice signal.

The communication unit 23 includes a communication interface for connecting the host device to an external device. The communication unit 23 communicates with an external device in a wired or wireless manner. The external device is, for example, an output destination of the conversion destination voice signal. In such a case, the communication unit 23 outputs the conversion destination voice signal to the external device by communication with the external device. The external device at the time of outputting the conversion destination voice signal is, for example, a voice output device of a speaker or the like.

The external device of the communication destination of the communication unit 23 is, for example, the voice signal conversion model learning device 1. In such a case, the communication unit 23 acquires, for example, the learned conversion learning model obtained by the voice signal conversion model learning device 1.

The external device of the communication destination of the communication unit 23 may be, for example, a storage device such as a USB memory storing a voice signal conversion model. In a case where the external device stores, for example, the voice signal conversion model and outputs the voice signal conversion model, the communication unit 23 acquires the voice signal conversion model by communication with the external device.

The external device of the communication destination of the communication unit 23 is, for example, an output source of the conversion source voice signal. In such a case, the communication unit 23 acquires the conversion source voice signal from the external device by communication with the external device.

The storage unit 24 is configured using a non-transitory computer-readable storage medium device such as a magnetic hard disk device or a semiconductor storage device. The storage unit 24 stores various types of information regarding the voice signal conversion device 2. The storage unit 24 stores, for example, the voice signal conversion model acquired via the communication unit 23.

The output unit 25 outputs various types of information. The output unit 25 includes, for example, a display device such as a CRT display, a liquid crystal display, or an organic EL display. The output unit 25 may be configured as an interface that connects these display devices to the host device. The output unit 25 outputs, for example, information input to the input unit 22.

Figure 8:
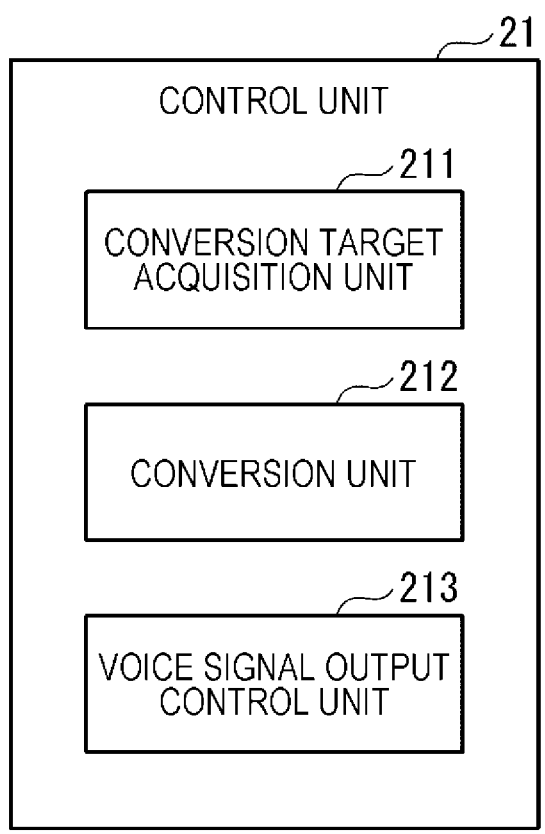
FIG. 8 is a diagram showing an example of a functional configuration of a control unit 21 according to the embodiment.

FIG. 8 is a diagram showing an example of a functional configuration of the control unit 21 according to the embodiment. The control unit 21 includes a conversion target acquisition unit 211, a conversion unit 212, and a voice signal output control unit 213.

The conversion target acquisition unit 211 acquires a conversion source voice signal to be converted. For example, the conversion target acquisition unit 211 acquires the conversion source voice signal input to input unit 22. The conversion target acquisition unit 211 acquires, for example, the conversion source voice signal input to the communication unit 23.

The conversion unit 212 converts the conversion target acquired by conversion target acquisition unit 211 into the conversion destination voice signal using the voice signal conversion model. The obtained conversion destination voice signal is output to the voice signal output control unit 213.

The voice signal output control unit 213 controls the operation of the communication unit 23. The voice signal output control unit 213 controls the operation of the communication unit 23 and causes the communication unit 23 to output the conversion destination voice signal.

Figure 9:
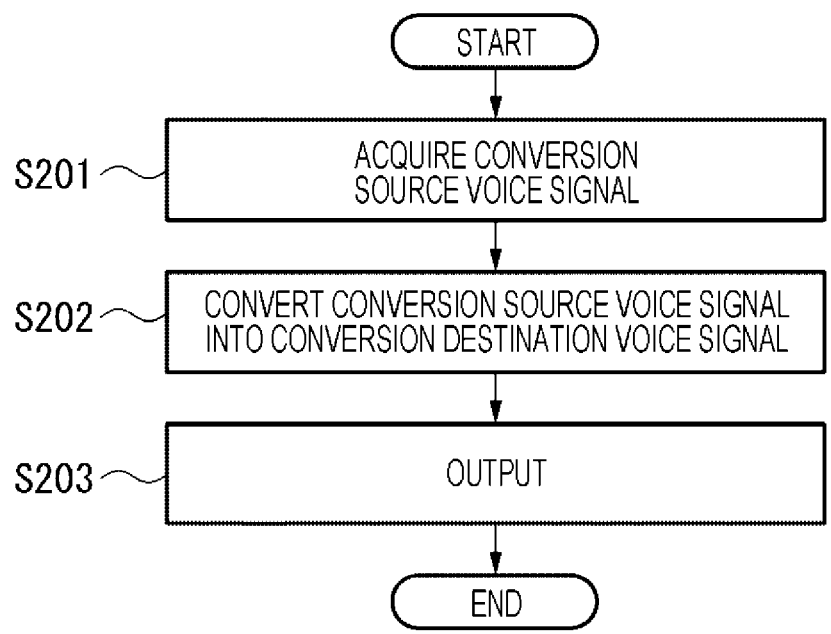
FIG. 9 is a flowchart showing an example of a flow of processing executed by the voice signal conversion device 2 according to the embodiment.

FIG. 9 is a flowchart showing an example of a flow of processing executed by the voice signal conversion device 2 according to the embodiment. The conversion target acquisition unit 211 acquires the conversion source voice signal (step S201). Next, the conversion unit 212 converts the conversion source voice signal into the conversion destination voice signal using the voice signal conversion model (step S202). Next, the voice signal output control unit 213 controls the operation of the communication unit 23 and causes the communication unit 23 to output the conversion destination voice signal (step S203).

Experimental Results

An example of an experimental result of conversion of a voice signal using the voice signal conversion system 100 of the embodiment will be described. In the experiment, voice data of 4 speakers of Voice Conversion Challenge (VCC) 2018 was used. Specifically, in the experiment, a female speaker VCC2SF3 (SF), a male speaker VCC2SM3 (SM), a female speaker VCC2TF1 (TF), and a male speaker VCC2TM1 (TM)) were used.

The experiments were speaker characteristic conversion. In the experiment, SF and SM were used as voices (hereinafter referred to as "conversion source voice") represented by the conversion source voice signal. In the experiment, TF and TM are used as voices (hereinafter referred to as "conversion target voice") represented by the voice signal to be compared with the conversion destination voice signal. In the experiment, an experiment was performed for each set of the conversion source voice and the conversion target voice. That is, four sets of experiments were performed. Specifically, the four sets are a total of four sets including a set of SF and TF, a set of SM and TM, a set of SF and TM, and a set of SM and TF.

In the experiment, 81 sentences were used as learning data for each speaker, and 35 sentences were used as test data. In the experiment, the sampling frequency of the entire voice signal was 22050 Hz. In the learning data, there is no identical utterance voice between the conversion source voice and the conversion target voice. Therefore, the experiment was an experiment that can be evaluated in a non-parallel setting.

In the experiment, a short-time Fourier transform with a window length of 1024 samples and a hop length of 256 samples was performed for each utterance. In the experiment, an 80-dimensional mel spectrogram was then extracted. In the experiment, this mel spectrogram was used as an acoustic feature quantity sequence, and learning of a converter of the mel spectrogram was performed. Specifically, the converter is the learning stage conversion unit 112. Note that the acoustic feature quantity sequence is an amount corresponding to the above-described x. That is, the acoustic feature quantity sequence is a local feature quantity of the processing target input data. In the experiment, a waveform generator constituted by a neural network was used to generate a waveform (that is, voice) from the mel spectrogram.

In the experiment, CycleGAN-VC2 described in Reference Literature 1, which is a conventional conversion technology to be described later, was used as a technology to be compared. Specifically, in the technology to be compared, a criterion obtained by combining Formula (4) and Formula (5) in the conventional conversion technology to be described later is used as the learning criterion.

Reference Literature 1: T. Kaneko, H. Kameoka, K. Tanaka, and N. Hojo, "CycleGAN-VC2: Improved CycleGAN-Based Non-Parallel Voice Conversion," in Proc. ICASSP, 2019.

Converters G and F and discriminators Dx, Dy, D'x, and D'y were modeled by the CNN. More specifically, the converters G and F are neural networks having seven processing units including following processing units from a first processing unit to a seventh processing unit. The first processing unit is an input processing unit by a 2D CNN, and includes one convolutional block. Note that 2D means two dimensions. The second processing unit is a downsampling processing unit using a 2D CNN, and includes two convolutional blocks. The third processing unit is a conversion processing unit for converting from 2D to 1D and includes one convolutional block. Note that 1D means one dimension.

The fourth processing unit is a difference conversion processing unit based on a 1D CNN, and includes six difference conversion blocks including two convolutional blocks. The fifth processing unit is a conversion processing unit for converting from 1D to 2D and includes one convolutional block. The sixth processing unit is an upsampling processing unit using a 2D CNN, and includes two convolutional blocks. The seventh processing unit is an output processing unit by a 2D CNN, and includes one convolutional block. Such a neural network has been a conventional conversion technology used in experiments.

In the experiment, in the voice signal conversion system 100, the conversion learning model of the voice signal conversion model learning device 1 is expressed by a neural network including the first processing unit, the second processing unit, the third processing unit, the fourth processing unit, and the seventh processing unit, and a fifth' processing unit and a sixth' processing unit. The fifth' processing unit is a neural network in which a neural network that executes mapping conversion processing is connected to the fifth processing unit. The sixth' processing unit is a neural network in which a neural network that executes mapping conversion processing is connected to the sixth processing unit. Specifically, the mapping conversion processing executed by the fifth' processing unit and the sixth' processing unit is conversion by affine conversion shown in Formula (1).

Specifically, the experiment was an experiment in which the evaluation of the sound quality of the voice conversion and the conversion effect was performed by a subjective evaluation experiment. For the evaluation of the sound quality, a mean opinion score (MOS) test regarding the naturalness of the voice was performed.

FIG. 10 is a first diagram showing an example of an experimental result according to the embodiment. In FIG. 10, a row of "Conventional approach" indicates a result of conversion by the CycleGAN-VC2 described above. In FIG. 10, "Approach of present invention" indicates a result of conversion by the voice signal conversion system 100. In FIG. 10, "SF-TF" indicates a set of SF and TF. In FIG. 10, "SM-TM" indicates a set of SM and TM. In FIG. 10, "SF-TM" indicates a set of SF and TM. In FIG. 10, "SF-TF" indicates a set of SM and TF. In the MOS, "5" represents the highest evaluation, and "1" represents the lowest evaluation.

FIG. 10 shows that the voice converted using the voice signal conversion system 100 has higher naturalness than the voice converted using the conventional conversion technology in all the conversion patterns. Note that, in all patterns, this means all four sets in total including a set of SF and TF, a set of SM and TM, a set of SF and TM, and a set of SM and TF.

In the experiment, for evaluation of the conversion effect, a MOS test regarding similarity of speaker characteristics was performed. In the MOS test for evaluation of a conversion effect, specifically, a conversion target voice is compared with a converted voice, and whether or not the voice is a voice uttered by the same speaker is evaluated in five stages.

FIG. 11 is a second diagram showing an example of an experimental result according to the embodiment. In FIG. 11, a row of "Conventional approach" indicates a result of conversion by the CycleGAN-VC2 described above. In FIG. 11, "Approach of present invention" indicates a result of conversion by the voice signal conversion system 100. In FIG. 11, "SF-TF" indicates a set of SF and TF. In FIG. 11, "SM-TM" indicates a set of SM and TM. In FIG. 11, "SF-TM" indicates a set of SF and TM. In FIG. 11, "SF-TF"

indicates a set of SM and TF. In the MOS, "5" represents the highest evaluation, and "1" represents the lowest evaluation.

FIG. 11 shows that the voice converted using the voice signal conversion system 100 has higher speaker similarity or comparable speaker similarity than the voice converted using the conventional conversion technology in all the conversion patterns. The comparable speaker similarity means speaker similarity which is comparable. Comparable means that evaluation results of speaker similarity are equivalent.

The voice signal conversion model learning device 1 of the embodiment configured as described above is a device using a machine learning technology, and is a device including the learning stage conversion unit 112. The learning stage conversion unit 112 acquires the adjustment parameter value by executing the adjustment parameter value acquisition processing, and learns the conversion learning model using the acquired adjustment parameter value. Since the adjustment parameter value is a statistical value of the distribution of the local feature quantity, the adjustment parameter value is information indicating the structure of the input data (that is, the data to be processed in the adjustment parameter value acquisition processing). Therefore, the voice signal conversion model learning device 1 can reduce loss of information of a voice signal to be converted in a voice quality conversion technology using machine learning.

In addition, the voice signal conversion system 100 of the embodiment configured as described above includes the voice signal conversion model learning device 1. Therefore, it is possible to reduce the loss of the information of the voice signal to be converted in the voice quality conversion technology using the machine learning.

Modification Example

The voice signal conversion model learning device 1 may be implemented by using a plurality of information processing devices connected to be capable of communicating with each other via a network. In this case, each functional unit included in the voice signal conversion model learning device 1 may be implemented in a distributed manner in the plurality of information processing devices.

The voice signal conversion device 2 may be implemented by using a plurality of information processing devices connected to be capable of communicating with each other via a network. In this case, each functional unit included in the voice signal conversion device 2 may be implemented in a distributed manner in the plurality of information processing devices.

Note that, all or some of the functions of the voice signal conversion system 100 may be realized using hardware such as an application specific integrated circuit (ASIC), a programmable logic device (PLD), or a field programmable gate array (FPGA). The program may be recorded on a computer-readable recording medium. The computer-readable recording medium is a storage device such as, for example, a portable medium such as a flexible disk, a magneto-optical disk, a read-only memory (ROM), a compact disc read-only memory (CD-ROM), or a hard disk built in a computer system. The program may be transmitted via an electrical communication line.

Description of Conventional Conversion Technology

Here, a conventional conversion technology will be described. The conventional conversion technology is specifically a technology of non-parallel voice quality conversion using the CyCleGAN.

It is assumed that a second-order tensor of Q×N of which the element is a real number is x, and a second-order tensor of Q×M of which the element is a real number is y. x is a tensor representing the acoustic feature quantity sequence of the voice of an attribute c. y is a tensor representing the acoustic feature quantity sequence of the voice of an attribute c'. Note that the acoustic feature quantity sequence is a sequence of acoustic feature quantities.

Q represents the number of dimensions of the acoustic feature quantity, and N and M represent sequence lengths of x and y, respectively. An object of the conventional conversion technology is to learn the converter G that converts x into the attribute c' and the converter F that converts y into the attribute c by using the non-parallel learning samples x and y.

Specifically, the converter G converts a second-order tensor of Q×N of which the element is a real number into a second-order tensor of Q×N of which the element is a real number. Specifically, the converter F converts a second-order tensor of Q×M of which the element is a real number into a second-order tensor of Q×M of which the element is a real number.

In the conventional conversion technology, the discriminator Dx for identifying whether or not the input voice is the real voice having the attribute c, and the discriminator Dy for identifying whether or not the input voice is the real voice having the attribute c' are used. In the conventional conversion technology, the converter G, the converter F, the discriminator Dx, and the discriminator Dy are learned based on the adversarial learning criterion $L_{adv}$ defined by Formula (4).

[Math. 4]

$$\mathcal{L}_{adv}(G, F, D_X, D_Y) = \mathbb{E}_{y \sim p_Y(y)}[\log D_Y(y)] + \\ \mathbb{E}_{x \sim p_X(x)}[\log(1 - D_Y(G(x)))] \\ + \mathbb{E}_{x \sim p_X(x)}[\log D_X(x)] + \\ \mathbb{E}_{y \sim p_Y(y)}[\log(1 - D_X(F(y)))]$$

(4)

In Formula (4), E represents an expectation value for a distribution represented by a subscript. x to px(x) and y to py(y) represent processing of sampling the learning sample from the learning data group.

$L_{adv}$ takes a large value in a case where Dx can correctly identify x as the real voice and identify F(y) as the synthesized voice and in a case where Dy can correctly identify y as the real voice and identify the identifier G(x) as the synthesized voice.

For the discriminator Dx and the discriminator Dy, learning is performed such that $L_{adv}$ increases, and for the converter G and the converter F, learning is performed such that $L_{adv}$ decreases. By performing learning in this manner, it is possible to reduce the probability that the acoustic feature quantity converted by the converter G and the converter F is identified as the real voice by the discriminator Dx and the discriminator Dy. Such a learning method is one of keys for obtaining a high-quality converted voice in a conventional conversion technology.

In the conventional conversion technology, learning may be further performed using a circulation consistency criterion $L_{cyc}$ defined by Formula (5), or learning may be performed using an identity conversion criterion $L_{id}$ defined by Formula (6).

[Math. 5]

$$\mathcal{L}_{cyc}(G,F) = \mathbb{E}_{x \sim p_X(x)}[\|F(G(x))-x\|_1] + \mathbb{E}_{y \sim p_Y(y)}[\|G(F(y))-y\|_1] \quad (5)$$

[Math. 6]

$$\mathcal{L}_{id}(G,F) = \mathbb{E}_{x \sim p_X(x)}[\|F(x)-x\|_1] + \mathbb{E}_{y \sim p_Y(y)}[\|G(y)-y\|_1] \quad (6)$$

$L_{cyc}$ is minimum in a case where x converted by G and then further converted by F matches x as it was originally and in a case where y converted by F and then further converted by G matches y as it was originally. On the other hand, $L_{id}$ is minimum in a case where the output of a case where y is an input of G does not change from y and in a case where the output of a case where x is an input of F does not change from x. By learning G and F to reduce these, it is possible to cause the converter G and the converter F to learn such that both G and F have one-to-one conversion. This is one of keys for realizing a non-parallel voice quality conversion method.

In a case where the criteria of Formula (5) and Formula (6) are also used, the criteria used for learning of G, F, Dx, and Dy in the conventional conversion technology are, for example, criteria represented by the following Formula (7).

[Math. 7]

$$\mathcal{L}_{full}(G,F,D_X,D_Y) = \mathcal{L}_{adv}(G,F,D_X,D_Y) + \lambda_{cyc}\mathcal{L}_{cyc}(G,F) + \lambda_{id}\mathcal{L}_{id}(G,F) \quad (7)$$

By repeatedly updating the parameters of G and F such that $L_{full}$ becomes small and repeatedly updating the parameters of Dx and Dy such that $L_{full}$ becomes large, it is possible to obtain the converter G and the converter F that mutually convert the acoustic feature quantity of the voice having the attribute c and the acoustic feature quantity of the voice having the attribute c'.

In the conventional conversion technology, a second type adversarial learning criterion $L_{adv2}$ expressed by Formula (8) may be further used in addition to Formula (7).

[Math. 8]

$$\mathcal{L}_{adv2}(G, F, D'_X, D'_Y) = \mathbb{E}_{x \sim p_X(x)}[\log D'_X(x)] + \\ \mathbb{E}_{x \sim p_X(x)}[\log(1 - D'_X(F(G(x))))] \\ + \mathbb{E}_{y \sim p_Y(y)}[\log D'_Y(y)] + \\ \mathbb{E}_{y \sim p_Y(y)}[\log(1 - D'_Y(G(F(y))))] \quad (8)$$

The discriminator D'x identifies whether or not the input voice is a real voice of the attribute c. The discriminator D'y identifies whether or not the input voice is a real voice of the attribute c'.

$L_{adv2}$ takes a large value in a case where D'x can correctly identify x as the real voice and identify F(G(x)) as the synthesized voice and in a case where D'y can correctly identify y as the real voice and identify the identifier G(F(y)) as the synthesized voice.

In the conventional conversion technology, learning is performed such that $L_{adv2}$ increases for D'x and D'y, and learning is performed such that $L_{adv2}$ decreases for G and F. As a result, it is possible to reduce the probability that the acoustic feature quantity cyclically converted by G and F is identified as a real voice by D'x and D'y.

Note that, in Formula (4) and Formula (8), an example has been described in which the cross entropy is used as a reference for identifying between the real voice and the synthesized voice. However, as a reference for identifying the real voice and the synthesized voice, any distance reference such as the Wasserstein distance or the L2 distance may be used.

In addition, in Formula (4) and Formula (5), an example has been described in which the L1 distance is used as a reference for identifying the real voice and the synthesized voice. However, as a reference for identifying the real voice and the synthesized voice, any distance reference such as the Wasserstein distance or the L2 distance may be used.

In the conventional conversion technology, the converter G, the converter F, the discriminator Dx, the discriminator Dy, the discriminator D'x, and the discriminator D'y are modeled by a neural network. As a specific neural network, a CNN is used. More specifically, an example of the converter G and the converter F is, for example, a neural network described in FIG. 12.

Figure 12:
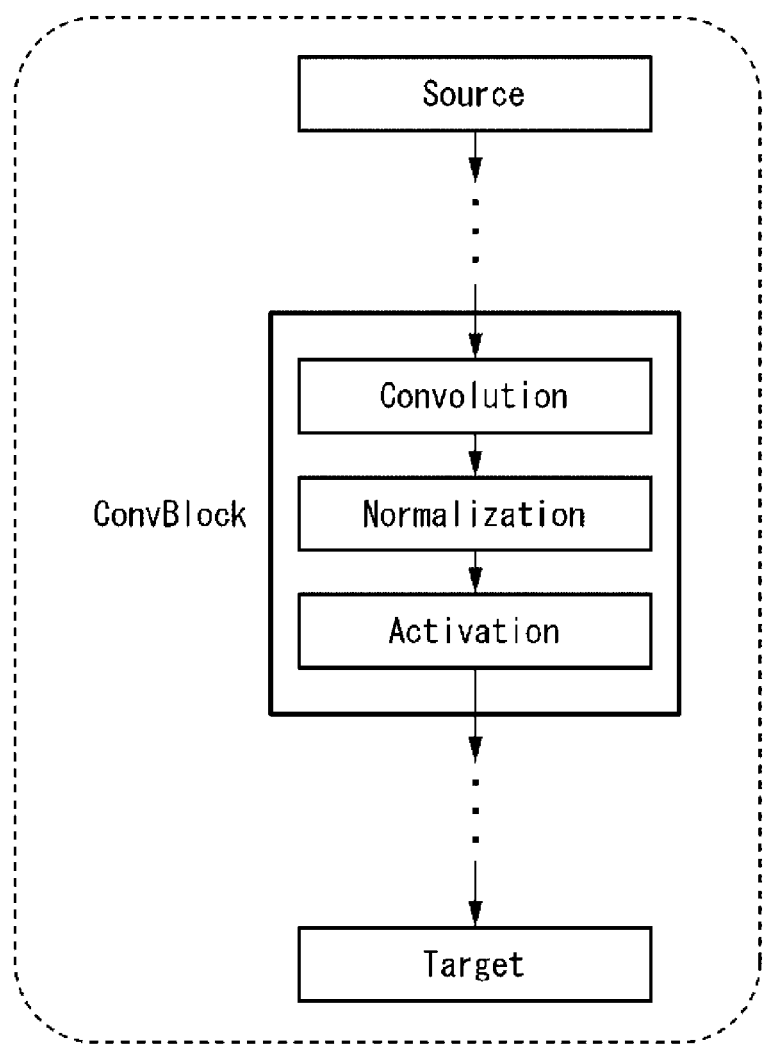
FIG. 12 is an explanatory diagram for explaining an example of a configuration of a neural network of a converter G and a converter F in the related art.

FIG. 12 is an explanatory diagram for explaining an example of a configuration of a neural network of the converter G and the converter F in the conventional conversion technology. The converter G and the converter F are neural networks having a convolutional block (ConvBlock) composed of three layers of a convolution layer, a normalization layer, and an activation layer in multiple layers. For example, in the converter G from x to y, when the acoustic feature quantity (source; x) of the conversion source voice is given as an input, learning is performed such that the acoustic feature quantity (target; y) can be output by applying the convolutional block over multiple layers.

Note that, as processing executed by the convolutional block, downsampling processing may be used, or upsampling processing may be used. As the processing executed by the convolutional block, tensor replacement processing of a feature quantity or processing of adding a value when the convolutional block is skipped and a value after application of the convolutional block may be used. As the convolutional block, one or more of the convolution layer, the normalization layer, and the activation layer may be removed. In addition, in the convolutional block, processing in which the order of processing of the convolution layer, the normalization layer, and the activation layer is switched may be executed.

In such a conventional conversion technology, since the acoustic feature quantity of the conversion source voice is sequentially converted in each layer, the original information of the acoustic feature quantity of the conversion source voice is lost in the subsequent layer. Therefore, in the conventional conversion technology, information to be originally retained before and after conversion may not be held.

In particular, in voice quality conversion, it is important to convert non-verbal/paralinguistic information while retaining linguistic information of a conversion source voice. That is, it is important to select information to be retained and information to be converted. However, as described above, in the conventional conversion technology, two pieces of information are sequentially converted simultaneously in a common neural network. For this reason, in the conventional conversion technology, the linguistic information is damaged in the process of converting the non-verbal/paralinguistic information, or as a result of an attempt to strengthen the retention of the linguistic information, it becomes difficult to convert the non-verbal/paralinguistic information.

The conventional conversion technology has been described above with the example in which the CNN is used as the neural network, but other neural networks may be used in the conventional conversion technology. For example, a feedforward neural network (FNN) or a recurrent neural network (RNN) may be used instead of the CNN. However, even when any neural network is used, the problem similar to the case of the CNN occurs in the conventional conversion technology.

One such conventional conversion technology is Cycle-GAN-VC2 described in Reference Literature 1. The description of the conventional conversion technology ends here.

Although the embodiments of the present invention have been described in detail with reference to the drawings, specific configurations are not limited to the embodiments, and include design and the like within the scope of the present invention without departing from the gist of the present invention.

REFERENCE SIGNS LIST

100 Voice signal conversion system
1 Voice signal conversion model learning device
2 Voice signal conversion device
11 Control unit
12 Input unit
13 Communication unit
14 Storage unit
15 Output unit
111 Learning data acquisition unit
112 Learning stage conversion unit
121 Learning stage conversion processing execution unit
122 Adjustment parameter value acquisition unit
123 Mapping conversion unit
124 Loss acquisition unit
113 Recording unit
114 Output control unit
115 End determination unit
21 Control unit
22 Input unit
23 Communication unit
24 Storage unit
25 Output unit
211 Conversion target acquisition unit
212 Conversion Unit
213 Voice signal output control unit
91 Processor
92 Memory
93 Processor
94 Memory

The invention claimed is:

1. A voice signal conversion model learning device comprising:
a processor; and
a storage medium having computer program instructions stored thereon, wherein the computer program instruction, when executed by the processor, perform processing of:
acquiring learning input data which is an input voice signal; and
executing a conversion learning model which is a model of machine learning including learning stage conversion processing of converting the learning input data into learning stage conversion destination data which is a voice signal of a conversion destination, wherein
the learning stage conversion processing includes local feature quantity acquisition processing of acquiring a feature quantity for each learning input-side subset which is a subset of processing target input data having the processing target input data as a population, based on the processing target input data which is data to be processed,
the conversion learning model further includes adjustment parameter value acquisition processing of acquiring an adjustment parameter value, which is a value of a parameter for adjusting a statistical value of a distribution of the feature quantity, based on the learning input data, and
the learning stage conversion processing converts the learning input data into the learning stage conversion destination data using a result of a predetermined calculation based on the adjustment parameter value, where the predetermined calculation converts the feature quantity according to the adjustment parameter value using affine conversion.

2. The voice signal conversion model learning device according to claim 1, wherein
the processing of converting the feature quantity is executed for each element of the feature quantity.

3. A voice signal conversion device comprising:
a processor; and
a storage medium having computer program instructions stored thereon, wherein the computer program instruction, when executed by the processor, perform processing of:
acquiring a voice signal to be converted; and
converting the conversion target using a learned conversion learning model obtained by a voice signal conversion model learning device including a processor; and
a storage medium having computer program instructions stored thereon, wherein the computer program instruction, when executed by the processor, perform processing of: acquiring learning input data which is an input voice signal; and executing a conversion learning model which is a model of machine learning including learning stage conversion processing of converting the learning input data into learning stage conversion destination data which is a voice signal of a conversion destination, wherein the learning stage conversion processing includes local feature quantity acquisition processing of acquiring a feature quantity for each learning input-side subset which is a subset of processing target input data having the processing target input data as a population, based on the processing target input data which is data to be processed, the conversion learning model further includes adjustment parameter value acquisition processing of acquiring an adjustment parameter value, which is a value of a parameter for adjusting a statistical value of a distribution of the feature quantity, based on the learning input data, and the learning stage conversion processing converts the learning input data into the learning stage conversion destination data using a result of a predetermined calculation based on the adjustment parameter value, where the predetermined calculation converts the feature quantity according to the adjustment parameter value using affine conversion.

4. A voice signal conversion model learning method comprising:
acquiring learning input data which is an input voice signal; and
executing a conversion learning model which is a model of machine learning including learning stage conversion processing of converting the learning input data into learning stage conversion destination data which is a voice signal of a conversion destination, wherein the learning stage conversion processing includes local feature quantity acquisition processing of acquiring a feature quantity for each learning input-side subset which is a subset of processing target input data having the processing target input data as a population, based on the processing target input data which is data to be processed, the conversion learning model further includes adjustment parameter value acquisition processing of acquiring an adjustment parameter value, which is a value of a parameter for adjusting a statistical value of a distribution of the feature quantity, based on the learning input data, and the learning stage conversion processing converts the learning input data into the learning stage conversion destination data using a result of a predetermined calculation based on the adjustment parameter value, where the predetermined calculation converts the feature quantity according to the adjustment parameter value using affine conversion.

5. A non-transitory computer readable medium which stores a program for causing a computer to function as the voice signal conversion model learning device according to claim 1.

6. The voice signal conversion model learning device of claim 1 wherein the feature quantity includes the input voice signal or acoustic feature quantities derived from the input voice signal.

* * * * *